ABSTRACT OF THE DISCLOSURE

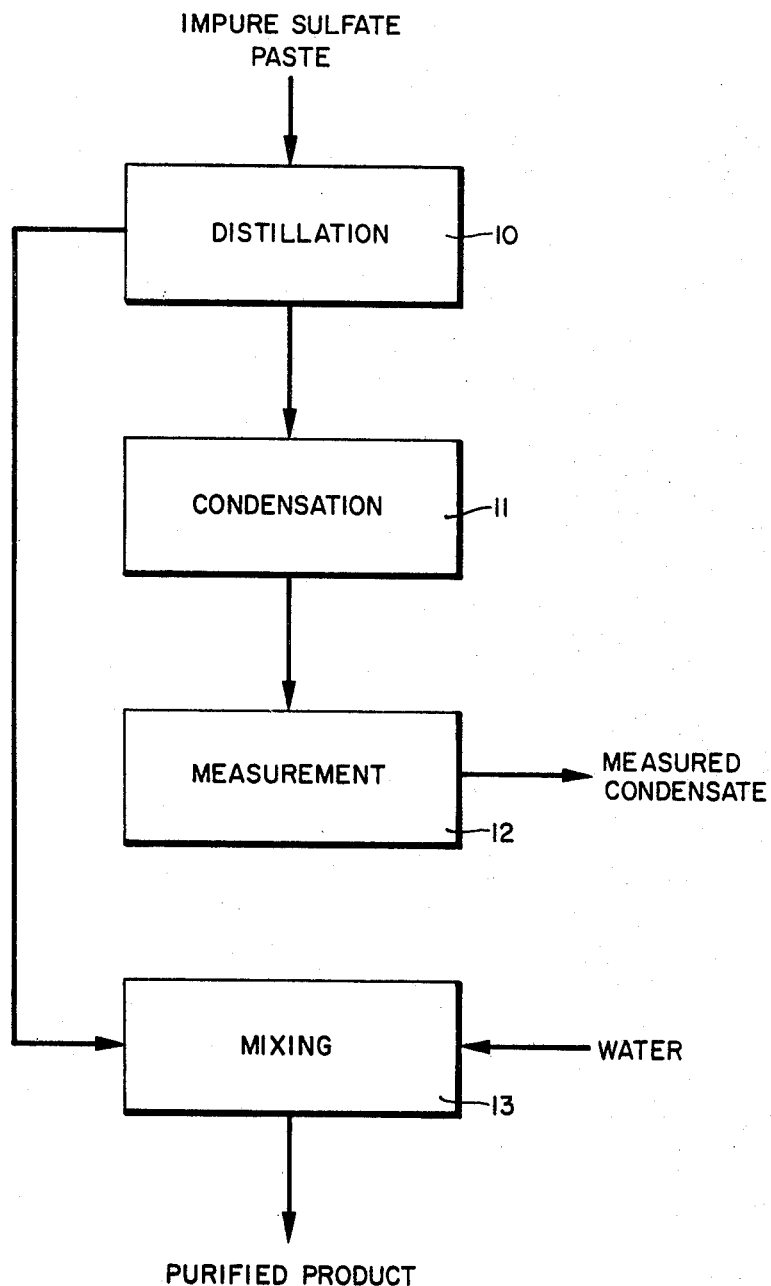

Disclosure is made that aqueous alkyl sulfate pastes prepared from synthetic primary alcohols which are normally processed at low temperatures of the order of 100° F. can be partially distilled to remove odor bodies contained therein resulting from impurities in the alcohols without destroying the valuable characteristics of such sulfate pastes in aqueous solutions. The distillation is at moderate temperatures of about 50 to 125° C. and preferably the distilled product is reconstituted to the original water content by back addition of pure water in a quantity corresponding to that removed in the distillation.

---

This invention relates to the production of alkyl sulfate pastes from primary alcohols and in particular to pastes which are produced from synthetic alcohols and which are exceedingly low in content of odoriferous materials.

The manufacture of sulfate pastes from alcohols particularly those having from about 12 to about 16 carbon atoms per molecule is of considerable commercial importance because such materials have utility in the formulation of home cleansing materials for rugs and the like, such materials being commonly called rug shampoos.

Sulfate pastes are commonly made by treating normal alcohols derived from vegetable sources, particularly coconut oil, with a material such as chlorosulfonic acid and subsequently neutralizing with sodium hydroxide to produce the paste in the form of the sodium salt, all under precisely controlled conditions where the maintenance of low temperatures is considered to be essential. A partial sulfation to approximately 85 percent completion of sulfation of the alcohols is generally employed, and the pastes normally examined and compared for qualtity purposes are in 30 percent aqueous solutions. These are standard but not essential proportions since variations are readily made not only in testing but also in use of the materials.

Vast industrial efforts are presently underway seeking to produce synthetic normal alcohols for this and other purposes from petroleum derived materials to replace or supplement the naturally derived alcohols and thereby liberate the industry from the vagaries of supply, demand, speculation, and the like, with regard to coconut oil.

Synthetic alcohols produced from basic materials derived from petroleum can provide a high degree of price stability because of virtual independence from weather and crop conditions and political problems in distant parts of the globe. Particularly is this true where the basic materials are largely by-products of domestic industry or are readily producible from domestic by-product materials such as those of the petroleum industry because in most instances refiners themselves are generally anxious to stabilize their by-product disposal through long-term contracts which provide guaranteed supply and fixed or predictable prices.

In the case of synthetic normal alcohols, aluminum chemistry, involving chain growth with ethylene on lower aluminum alkyls, such as triethyl aluminum, oxidation of the alkyls to the alkoxides, and hydrolysis of the alkoxides to the alcohols, permits the production of high quality normal alcohols from a comparatively basic and low cost raw material, ethylene.

Although synthetic normal alcohols can thus be produced with such excellent quality as to be virtually indistinguishable from the materials derived from coconut oil on most analysis and performance bases, such synthetics contain trace quantities of non-odorous materials which are converted to odorous materials during the aforementioned processing to produce the sulfate pastes. The non-odorous precursors cannot be removed from the alcohols by simple procedures such as distillation because of overlapping boiling points. Emphasizing this fact, British Patent 1,006,047 seeks to solve the problem by using silica gel as a selective adsorbent treatment of the alcohols to remove the odor precursors at that point.

Unfortunately the published purification techniques for alcohols such as that using silica gel adsorption are not overly effective nor are they economically attractive. For the most part, any potential selectivity of adsorption of the odor precursors is difficult to realize on a practical basis because of the overwhelming excess of alcohol in a parts per million impurity situation as exists in this instance. The adsorbents, even when selective as to impurities, generally become loaded with alcohols after only brief periods of operation so that they no longer adsorb the impurities, necessitating plural contacting, and vast recovery operations for both adsorbent and alcohol.

With techniques such as the foregoing being considered as useful, desirable, and even necessary by large scale producers and users of synthetic alcohols, it is surprising that an entirely different approach to the problem yields excellent results as to the removal of impurities from the sulfate pastes themselves at low cost. There seems to have been no prior art effort to remove the odorous impurities from the sulfate pastes themselves. All effort appears to have been directed to treatment of the synthetic alcohols to maintain identical processing to that used with the coconut oil derived materials. The reason for this is unknown but one can speculate that, in addition to involving variation from established procedure, this is not what one skilled in the art would attempt because of his knowledge of the great criticality of conditions in the reaction to produce the sulfate pastes, particularly as to temperature, presence of water, and the like, and his consequent avoidance of all thought of using distillation purification at this point.

For reference purposes a typical procedure for forming the pastes from the natural alcohols is as follows. Similar procedures apply to synthetic alcohols.

To 100 parts of mid-cut coconut alcohol in a 500 ml. three-neck flask, add 0.85–0.90 mols of chlorosulfonic acid per mol of alcohol over a 10–15 minute period. The contents of the flask are agitated and maintained at 90–110° F. during the acid addition. Hydrochloric acid is removed as formed by maintaining a slight vacuum on the flask. The acid mixture is neutralized by addition thereof to a solution of sodium hydroxide in water. For this addition, 100 grams of acid mix is added over a 12 minute period to a solution of 13.5 grams of sodium hydroxide and ½ gram of citric acid buffer in 239 grams of distilled water. The solution is carried to a pH of 8.0. The first reaction is:

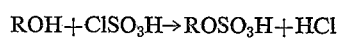

ROH + ClSO$_3$H → ROSO$_3$H + HCl

The neutralization reaction is:

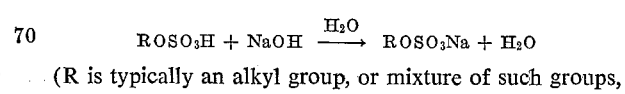

ROSO$_3$H + NaOH $\xrightarrow{\text{H}_2\text{O}}$ ROSO$_3$Na + H$_2$O (R is typically an alkyl group, or mixture of such groups, having from about 12 to 14 carbon atoms each, corresponding to the organo radical desired in the paste.)

Thus it has been discovered with considerable surprise that a simple distillation procedure will remove the odor bodies from the sulfate pastes without irretrievably altering the pastes which undergo nothing more serious than partial dehydration mainly as to physically associated water which is readily replenished if desired on a partial or complete basis after the distillation procedure. The pastes when thus reconstituted to original water content provide properties identical to and in many instances superior to the properties of pastes produced from alcohols derived from coconut oil.

Beyond this, once it was shown that the sulfate pastes could be distilled and reconstituted successfully, the process was applied to sulfate pastes produced from coconut derived alcohols leading to the discovery that even the sulfate pastes produced from coconut derived alcohols can be improved by the present distillation and reconstitution process.

It has also been discovered that the odorous sulfate pastes produced from mid-cut synthetic coconut alcohols having from 12 to 14 carbon atoms per molecule contain water soluble odor bodies in addition to the insoluble odor bodies which are idscussed by the British Patent 1,006,047. The presence of tetrahydrofuran and 2-normal ethyl tetrahydrofuran has now been established and these materials in addition to being water soluble are more volatile than the previously known 2-normal butyl tertahydrofuran and hence are more potent odor bodies despite the relatively small quantities thereof. In some instances unrelated to the present, the higher homologues of the substituted tetrahydrofurans are considered to have desirable odors however even in those situations the particularly strong and penetrating odors of tetrahydrofuran and 2-ethyl tetrahydrofuran are not accepted. Removal of the tetrahydrofuran materials from the pastes is relatively easy because of boiling point characteristics.

The interconnection of the preceding discussion is shown in the figure with distillation 10 receiving the impure sulfate paste material to provide an overhead stream which is condensed at 11 and measured at 12. The residue from distillation 10 is delivered to mixer 13 at which point it is combined with makeup water usually corresponding to the amount of condensate measured at 12 providing a purified sulfate paste product from mixer 13 having about the same percentage of water content as the impure material. It is evident that greater or lesser quantities of water can be added where a deliberate variation from the original water content is desired or with steam distillation.

EXAMPLE I

A sample of synthetic alcohol produced via aluminum chemistry and distilled to provide a center cut analyzing approximately 65 percent (weight) normal $C_{12}$ alcohol, 25 percent normal $C_{14}$ alcohol and 10 percent normal $C_{16}$ alcohol was sulfated. This alcohol was produced by acid hydrolysis of the alkoxide followed by neutralization with ammonia. The sulfation process used was as previously described.

This paste was tested by an odor panel and judged to have an odor level considerably higher than that of a standard paste of low odor.

A 500 gram sample of a 30 percent (by weight) sulfate paste was heated in a 5 liter flask 10 provided with a condenser 11 and condensate receiver. The material was raised from 24° C. to the atmospheric boiling point (approximately 102° C.) and held at that point for approximately 3 hours during which period a total of 150 cc. of overhead material was collected and measured at 12 in three 50 cc. cuts all of which had a strong odor with the last cut the weakest of the three. The three cuts had a cloudy appearance. A minute organic layer formed on the top of the first two cuts. No color change was observable during or after the treatment.

150 cc. of fresh water was then added to the distillation residue at mixer 13. The sulfate paste material product from 13 thus reconstituted had an odor level weaker than that of the standard and was judged to be indistinguishable from the standard as to performance characteristics as a rug shampoo material.

The organic phases were separated from cuts 1 and 2 (less than 1 drop total organic) and analyzed using a capillary type VPC apparatus (Carbowax 1540). The presence of material corresponding to tetrahydrofuran, 2-normal butyl tetrahydrofuran, 2-normal hexyl tetrahydrofuran, and 2-normal octyl tetrahydrofuran was shown.

The aqueous portions of cuts 1 and 2 and all of cut 3 were combined, and extracted with pentane to remove residual organic phase material. The cloudy appearance persisted as did the strong penetrating odor of 2-ethyl tetrahydrofuran.

EXAMPLE II

Example I was repeated using as feed material the reconstituted paste obtained as a product of Example I. A trace of organic material was collected overhead however the three overhead fractions still provided noticeable odors and minor cloudiness. The sulfate paste was again reconstituted by addition of water. The product sample was judged to have about the same odor level as the feed material.

From this it is concluded that the second treatment removed some odor bodies however the first treatment was adequate to lower the odor to an acceptable level relative to the standard, at least as far as the subjective comparison technique could show any difference.

EXAMPLE III

Example I was repeated however 100 grams of water was added to the 500 gram sample prior to the start of the distillation. Results were similar, however in reconstituting the paste after distillation, 100 grams less than that collected overhead was added.

EXAMPLE IV

The reconstituted product of Example I was compared with a sulfate paste produced from a sample of coconut derived alcohols of similar molecular weight distribution. The odor panel rated the coconut materials weaker in odor level.

EXAMPLE V

A sample of the coconut derived paste used in Example IV for comparison was distilled as in Example I. Traces of organic phase were collected overhead. A minor amount of cloudiness was noted in the water phase collected overhead. Odor panel comparison of "before and after treatment" samples was not conclusive however it was indicative of lesser odors in general in the treated sample.

EXAMPLE VI

Example I was repeated under vacuum maintaining a boiling point of 45–50° C. The overhead was collected in Dry Ice traps which were later thawed out and the material measured, examined, treated and analyzed as in Example I. The material collected was 220 grams. An equal volume of water was added back to the residue to reconstitute the paste. The paste thus reconstituted was judged by 8 out of 10 panel members to be weaker in odor than the startiing paste. This is considered to be a significant improvement. It is believed that the difference in condensate volume collected is not of particular significance except for indicating that the distillation of Example II was somewhat more extensive than that of Example I and that neither removed all the water present.

EXAMPLE VII

The preceding examples are repeated in a series of runs with water addition on continuous and intermittent bases before, during and after the distillation, including steam distillation, and in various combinations and with various relationships between the starting and product water content. Similar results as to reduction in odor level are obtained.

From the foregoing examples it is concluded that distillation of a simple nature can successfully remove odor bodies from sulfate pastes and that such treatment can be performed without causing serious or even noticeable degradation of the pastes. The improvement, although to a large extent necessarily qualitatively determined, is real, and made on the standard industrial practice basis that determines whether synthetic alcohol purity is reasonably close to coconut derived alcohols as to be acceptable in certain critical use applications.

What is claimed is:

1. A method of removing odor bodies from aqueous alkyl sulfate pastes containing desired organo constituents, the alkyl groups having from about 2 to about 40 carbon atoms each, said pastes being in the form of aqueous mixtures of from about 10 to about 50 weight percent concentration produced from synthetic alcohols derived by the oxidation of aluminum alkyls to aluminum alkoxides and the hydrolysis of the aluminum alkoxides to corresponding alcohols, comprising, distilling the pastes under non-destructive conditions at a temperature of from about 50 to about 125° C. from about ½ to about 3 hours to remove from about 5 percent to about 25 percent of the water originally present as an overhead stream, and controlling the water content of the pastes by adding make-up water free of undesired odor bodies to the system to replace water removed, whereby a desired water content of the distilled product is obtained.

2. The process of claim 1 wherein the starting paste is an aqueous sodium alkyl sulfate paste of from about 10 to about 50 weight percent concentration, the alkyl groups having from about 2 to about 40 carbon atoms each, the distillation is at about atmospheric pressure for about ½ to about 3 hours during which time the paste is concentrated by the removal of from about 5 percent to about 25 percent of the water originally present, and a make-up water free of undesired odor bodies is added to the pastes in an amount substantially equal to the amount of water removed in the distillation operation.

3. The process of claim 1 wherein the starting paste is an aqueous sodium alkyl sulfate paste of from about 10 to about 50 weight percent concentration, the alkyl groups having from about 2 to about 40 carbon atoms each, the distillation is at about atmospheric pressure for about ½ to about 3 hours at least a part of which time steam is admitted to the system, an overhead stream is collected in excess of about 5 percent of the weight of water originally present in the paste, and a make-up water free of undesired odor bodies is added to the pastes in an amount substantially equal to the amount of water removed in the distillation operation.

References Cited
UNITED STATES PATENTS

| | | | |
|---|---|---|---|
| 1,074,633 | 10/1913 | Lilienfeld | 260—459 |
| 1,411,215 | 3/1922 | Kuh | 260—459 |
| 2,105,512 | 1/1938 | Stehman | 203—92 X |
| 2,200,216 | 5/1940 | Lowenberg et al. | 260—459 |
| 2,227,659 | 1/1941 | Luther et al. | 260—459 |
| 2,316,670 | 4/1943 | Colgate et al. | 260—459 |
| 3,083,146 | 3/1963 | Sweeney et al. | 203—92 X |
| 3,290,396 | 12/1966 | Starks et al. | 260—459 |
| 3,296,318 | 1/1967 | Starks | 260—459 |
| 3,337,601 | 8/1967 | Whitman | 260—459 |

WILBUR L. BASCOMB, Jr., Primary Examiner

U.S. Cl. X.R.

203—14, 44, 96, 99; 260—459